United States Patent
Krishnan et al.

(10) Patent No.: US 8,124,893 B2
(45) Date of Patent: Feb. 28, 2012

(54) MULTI-FUNCTIONAL SWITCH ASSEMBLY

(75) Inventors: Venky Krishnan, Canton, MI (US); Kosta Papanikolaou, Huntington Woods, MI (US); Jerry P. Bonnici, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 851 days.

(21) Appl. No.: 12/186,214

(22) Filed: Aug. 5, 2008

(65) Prior Publication Data

US 2010/0032274 A1  Feb. 11, 2010

(51) Int. Cl.
*H01H 13/70* (2006.01)
*H01H 25/00* (2006.01)
*H01H 25/04* (2006.01)

(52) U.S. Cl. .................. 200/5 R; 200/6 A
(58) Field of Classification Search ............ 200/5 R, 200/6 A
See application file for complete search history.

(56) References Cited

U.S. PATENT DOCUMENTS

| | | | |
|---|---|---|---|
| 4,450,390 A | | 5/1984 | Andrei-Alexandru et al. |
| 4,858,971 A | | 8/1989 | Haag et al. |
| 5,920,042 A | * | 7/1999 | Gotoh ........................ 200/5 R |
| 6,274,826 B1 | * | 8/2001 | Serizawa et al. ............... 200/5 R |
| 6,746,067 B2 | | 6/2004 | Schmidt et al. |
| 6,787,716 B1 | | 9/2004 | Menche |
| 6,953,901 B2 | | 10/2005 | Onodera |
| 6,974,918 B2 | | 12/2005 | Blossfeld |
| 7,078,632 B2 | | 7/2006 | Komatsu |
| 7,145,299 B2 | | 12/2006 | Noro et al. |
| 7,262,375 B2 | | 8/2007 | Sakai |
| 7,268,305 B2 | | 9/2007 | Schmidt et al. |
| 7,439,459 B2 | * | 10/2008 | Hyun et al. .................... 200/5 R |
| 7,439,460 B1 | * | 10/2008 | Watson ........................ 200/5 R |

* cited by examiner

*Primary Examiner* — R S Luebke
*Assistant Examiner* — Lheiren Mae Caroc
(74) *Attorney, Agent, or Firm* — Greg P. Brown; Brooks Kushman P.C.

(57) ABSTRACT

A multi-functional switch assembly for a vehicle interior is provided. In at least one embodiment, the switch assembly includes a switch base having a guide with a longitudinal axis and a transverse beam member; and a switch body mounted to the guide of the switch base for limited translation along the longitudinal axis between a rest position and a transient position, wherein at the rest position, the switch body is pivotal about the transverse beam member between a first and a second transverse positions, wherein the rest and the transient positions are translatable to a first set of operative functions, wherein the first and the second transverse positions are translatable to a second set of operative functions.

18 Claims, 3 Drawing Sheets

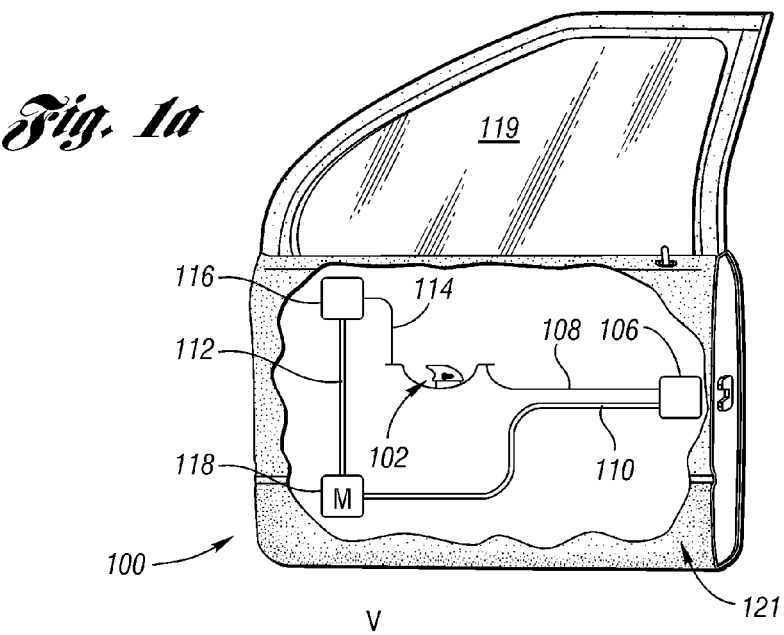
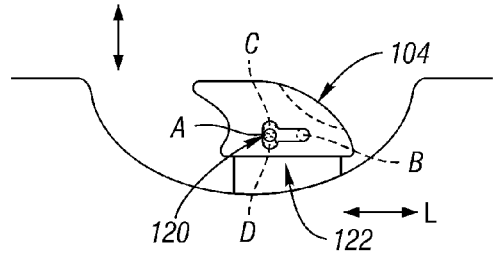
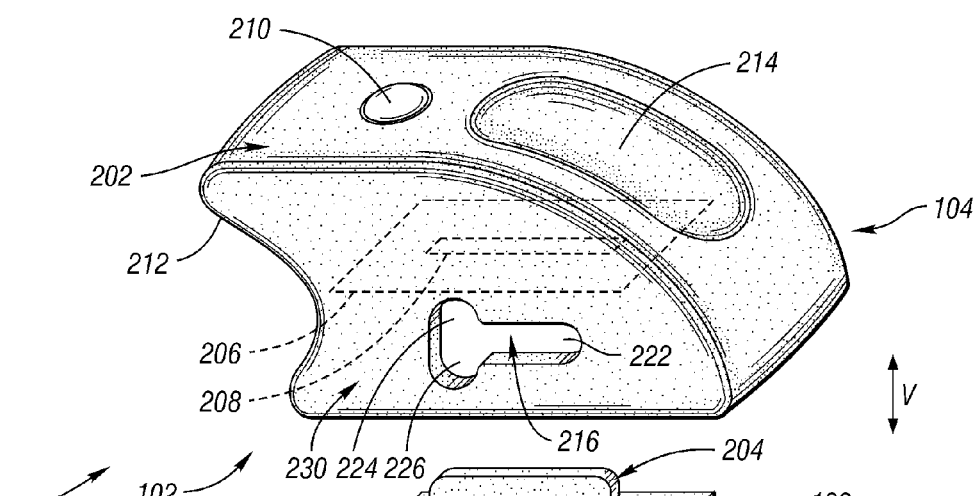
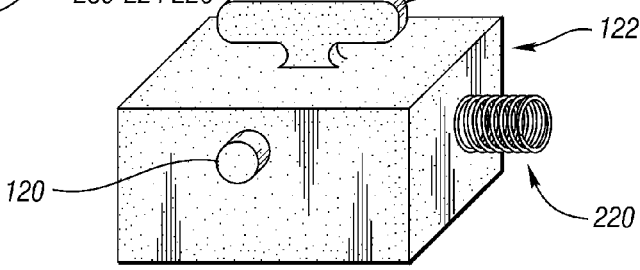

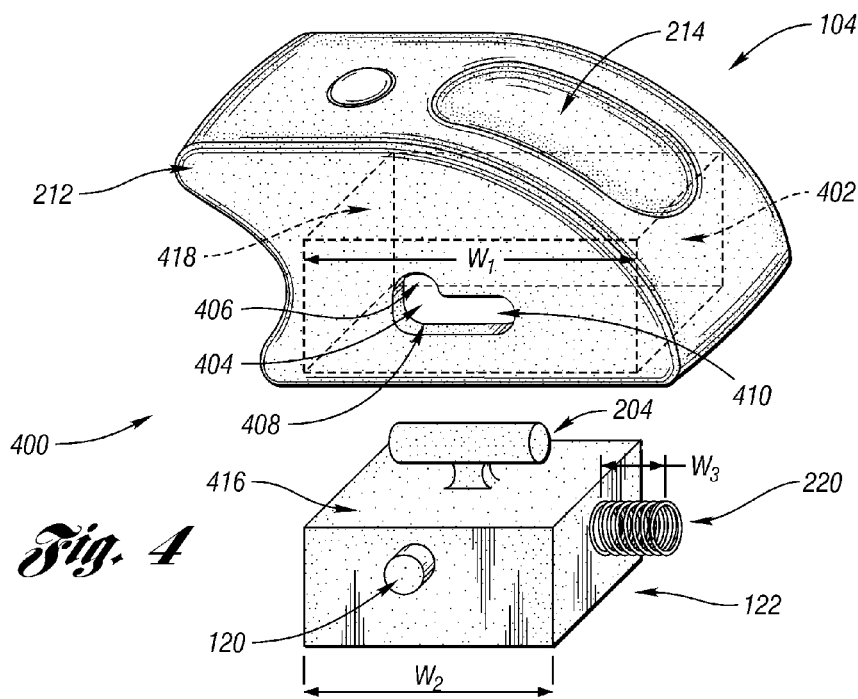
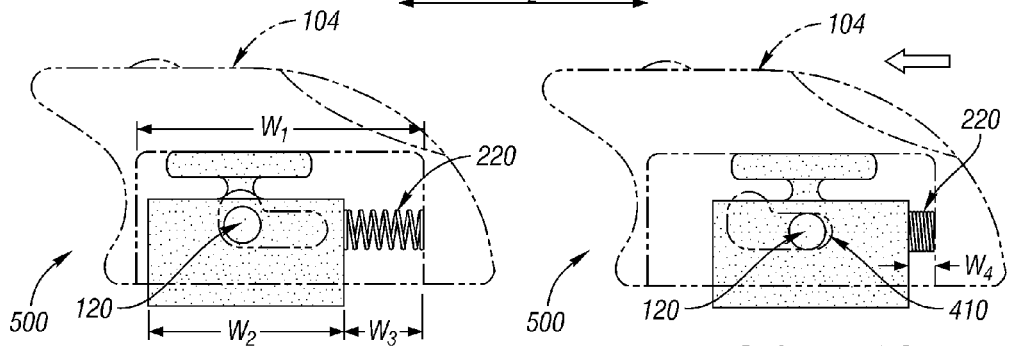
Fig. 4
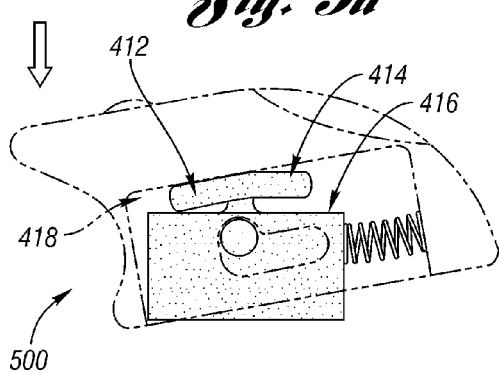
Fig. 5a    Fig. 5c
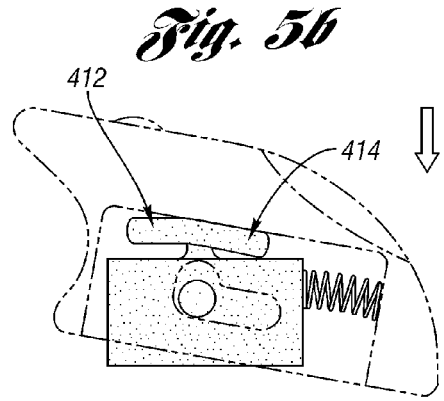
Fig. 5b    Fig. 5d

MULTI-FUNCTIONAL SWITCH ASSEMBLY

BACKGROUND

1. Technical Field

Embodiments of the invention relate to a multi-functional switch assembly for a motor vehicle interior.

2. Background Art

Many types of switches are conventionally used for operable motor vehicle components such as seat adjustment mechanisms, mirror adjustment mechanisms, door locks, window lifting devices, pedal adjustment mechanisms, and steering column adjustment mechanisms.

Vehicle doors or windows are known to be operated through separable actuating switches. By way of example, a vehicle door typically includes a lock/unlock mechanism which functions to lock the door when the door is closed and includes mechanical handles attached by mechanical links to the lock/unlock mechanism for unlatching. A power lock apparatus is often added to operatively link the door with an electric actuator and at least one switch such that the power lock apparatus is mechanically linked to the lock/unlock mechanism.

Similarly, a switch for a vehicle window is typically installed for activating "window up" and "window down". However, the switch designed for operating the vehicle windows is conventionally located in a vehicle interior separable from where the door actuating switch is located. As such, the door switch and the window switch are often independently arrayed on a switch panel along with additional switches for other vehicular functions.

It is desirable to reduce vehicle interior space consumption and unnecessary expenses associated with implementing multiple switches.

SUMMARY

According to at least one embodiment of the present invention, a multi-functional switch assembly for a vehicle interior is provided. The switch assembly includes a switch base having a guide with a longitudinal axis and a transverse beam member; and a switch body having an outer surface and mounted to the guide of the switch base for limited translation along the longitudinal axis between a rest position and a transient position, wherein at the rest position, the switch body is pivotal about the transverse beam member between a first and a second transverse positions, wherein the rest and the transient positions are translatable to a first set of operative functions, wherein the first and the second transverse positions are translatable to a second set of operative functions.

In at least another embodiment, the switch body is spring loaded to return to the rest position from the transient position.

In at least another embodiment, a portion of the outer surface of the switch body forms a depression and the first set of operative functions is effectuated upon the depression being pushed substantially along the longitudinal axis.

In at least another embodiment, a portion of the outer surface of the switch body forms a tab and the second set of operative functions is effectuated upon the tab being lifted or pressed.

In at least another embodiment, the guide is made of substantially resilient material to withstand a pivoting movement of the switch body about the transverse beam member.

In at least another embodiment, the switch assembly further includes a light emitting diodes (LED) indicating the status of at least one of the operative functions.

According to at least another embodiment of the present invention, a vehicle door having a multi-functional switch is provided. The vehicle door includes a door trim panel having a guide with a longitudinal axis and a transverse beam member; and a switch body having an outer surface and mounted to the guide of the door trim panel for limited translation along the longitudinal axis between a rest position and a transient position, wherein at the rest position, the switch body is pivotal about the transverse beam member between a first and a second transverse positions, wherein the rest and the transient positions are translatable to a first set of operative functions, wherein the first and the second transverse positions are translatable to a second set of operative functions.

BRIEF DESCRIPTION OF THE DRAWINGS

One or more embodiments of the present invention will become more apparent to one skilled in the art upon consideration of the following description of the accompanying drawings in which:

FIG. 1a schematically depicts a vehicle door having a multi-functional switch assembly according to at least one aspect of the present invention;

FIG. 1b is an enlarged side elevation view of the multi-functional switch assembly referenced in FIG. 1a;

FIG. 2 is an exploded perspective view of a multi-functional switch assembly according to at least one embodiment of the present invention;

FIG. 4 is an exploded perspective view of a multi-functional switch assembly according to at least another embodiment of the present invention; and FIGS. 5a-5d illustrate various operative positions, in cross-sectional view, of a switch body relative to a switch base of the multi-functional switch assembly referenced in FIG. 4.

DETAILED DESCRIPTION OF THE PREFERRED EMBODIMENTS

Figure 3A:
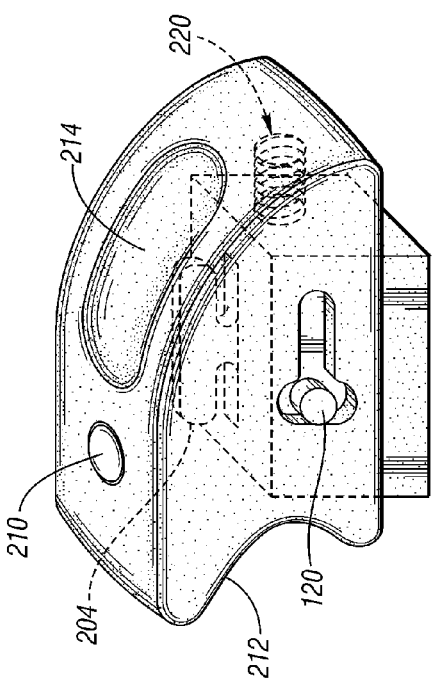
FIGS. 3a-3d illustrate various operative positions of a switch body relative to a switch base of the multi-functional switch assembly referenced in FIG. 2.

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

The present invention relates to a multi-functional switch assembly for controlling two or more components on a vehicle. The components may include a door, a window, a seat, a mirror, or the like. The specific embodiment of the invention described below relates to a power window and a power lock for a door. Those skilled in the art, however, will appreciate that the switch assembly of the present invention may control a device other than a window or a door.

In at least one embodiment of the present invention, a multi-functional switch assembly having a switch base and a switch body is provided for a vehicle interior. The switch assembly is operable to actuate at least two sets of vehicle functions. The functions may include locking or unlocking of a vehicle door; and opening or closing a vehicle window. In at least one embodiment, the switch assembly effectuates the locking or unlocking of the vehicle door through limited translation along a longitudinal axis of the switch body. In at least another embodiment, the switch assembly effectuates the opening or closing of the vehicle window through pivotal movement about a transverse beam member of the switch base. The multi-functional switch assembly, as described in more detail below, offers greater vehicle space utilization and enhanced economical efficiency.

It should be appreciated that the scope of this invention is not intended to be limited for use with the specific structure and controls for the vehicle interior described above. On the contrary, as will become apparent below, this invention may be used in any desired environment for the purposes described below.

With reference now to the figures, where like numerals represent similar structures, a vehicle door generally shown at 100 is depicted in FIG. 1a. A multi-functional switch assembly 102 is shown to be mounted to a door trim panel 121 of the door 100. An interior lock/unlock module 106 for locking or unlocking the door 100 is connected through a wiring harness 110 to a motor 118 and is also in electrical communication with a multi-functional switch assembly 102 through a cable 108. The multi-functional switch 102 will be described in more detail in connection with FIGS. 1b, 2, and 3a-3d. Similarly an interior window module 116 for opening or closing the window 119 is connected through a wiring harness 112 to the motor 118 and is in electrical communication with the multi-functional switch assembly 102 through a cable 114.

In at least one embodiment, and as illustratively shown in FIG. 1b, the multi-functional switch 102 is depicted to be comprised of a switch body 104 and a switch base 122 having a transverse beam member 120. The switch body 104 is movable about the transverse beam member 120 with limited translation along a longitudinal axis "L" between a rest position "A" and a transient position "B". Optionally, the switch base 122 along with the transverse beam member 120 may be formed integral to the door trim panel 121. The rest position "A" and the transient position "B" are translatable to a first set of vehicle functions illustratively including locking or unlocking the vehicle door 100. More detailed illustration of the rest position "A" and the transient position "B" will be provided as below in relation to FIGS. 3a-3d.

As will be described in detail in relation to FIGS. 2 and 3a-3d, when positioned at the rest position "A", the switch body 104 is pivotal about the beam member 120 between a first transverse position "C" and a second transverse position "D". The first and the second transverse positions are translatable to a second set of operative functions illustratively including opening or closing the vehicle window 119.

In at least one embodiment, and as illustratively shown in FIG. 2, the switch body 104 has an outer surface 202 and is mounted to a guide 204 of the switch base 122 for limited translation along the longitudinal axis "L". In at least one embodiment, a preselected portion 212 of the outer surface 202 takes the shape of a tab, which a user may lift or press to facilitate the pivoting movement of the switch body 104 about the transverse beam member 120 in the direction "V". In at least one embodiment, another preselected portion 214 of the outer surface 202 may take the shape of a depression to facilitate, e.g., the limited translation of the switch body 104 along the longitudinal direction "L". It is appreciated that the preselected portion 212 or 214 may be of any shape, including a tab, a handle, a ring, or a depression. Designing such shapes is well within the skills in the art.

In at least one embodiment, the transverse beam member 120 and the guide 204 are spaced apart along the direction "V". In at least one particular embodiment, the guide 204 is disposed between the outer surface 202 of the switch body 104 and the transverse beam member 120 of the switch base 122 when the switch body 104 is mounted to the switch base 122.

Aside from providing structural engagement between the switch body 104 and the switch base 122, and in at least one embodiment, the limited translation of the switch body along the guide 204 is also in cooperation with a limited translation of the switch body 104 about the transverse beam member 120 through an insert passage 216. The insert passage 216 may be integral to the frontal wall 230 of the switch body 104, or may be disposed internally (not shown) within the switch body 104 such that the insert passage 216 would be enveloped when viewed from the frontal wall 230. The insert passage 216 may be duplicated on a back wall (not shown) of the switch body 104 directly opposing the frontal wall 230 for added movement guidance. In such instances, the transverse beam member 120 spans across the switch base 122 such that the transverse beam member 120 is in contact with the insert passage 216 on both the frontal wall 230 and back wall (not shown).

In at least one embodiment, the insert passage 216 is substantially of a key shape having a lateral terminal 222, a first transverse terminal 224, and second transverse terminal 226. In at least one particular embodiment, the switch body 104 moves along the longitudinal axis "L" upon a push on the preselected portion 214. As a result of the movement, the transverse beam member contacts the lateral terminal 222 of the insert passage 216 to arrive at the transient position "B". The transient position "B" is operatively translatable to a first transient function such as locking the vehicle door 100.

When at the rest position "A", the switch body 104 is movable pivotally about the transverse beam member 120 between the first transverse position "C" or the second transverse position "D". As a result of the pivotal movement, the transverse beam member 120 contacts the first transverse terminal 224 and the second transverse terminal 226 of the insert passage, respectively.

In at least one particular embodiment, the first transverse position "C" is operatively translatable to a first transverse function such as opening a window while the second transverse position "D" is operatively translatable to a second transverse function such as closing the window.

In at least one embodiment, the guide 204 of the switch base 122 is made of substantially resilient material to withstand a pivoting movement of the switch body 104 about the transverse beam member 120. Additionally, the resilient force inherent within the resilient material of the guide 204 enables an automatic return of the switch body 104 to the rest position "A" from either the first or the second transverse position "C" or "D".

As mentioned above, the transverse beam member 120 may be formed as a separate component to be assembled with another door trim panel component, or may be integrally formed as part of the door trim panel 121. The transverse beam member 120 may be made of any conventional material such as molded plastic or metal. The switch base 122 may also include various other apertures or flanges to facilitate the mounting of the switch body 104 to the switch base 122.

In at least one embodiment, and as illustrated in FIG. 2, the guide 204 is received through an opening 208 of a floor 206 situated within the switch body 104 such that the switch body 104 is mounted to the guide for limited translation along the longitudinal axis between the rest position "A" and the transient position "B".

In at least one embodiment, and as illustrated in FIG. 3a, the switch body 104 is shown positioned in the rest position "A" relative to the switch base 122. In the rest position "A", the switch body 104 is structurally supported through a flexible engagement between the guide 204 and the opening 208. Further, the transverse beam member 120 is substantially suspended within a keyhole area of the insert passage 216 such that the transverse beam member 120 does not touch either the transverse terminal 224 or 226.

Figure 3B:
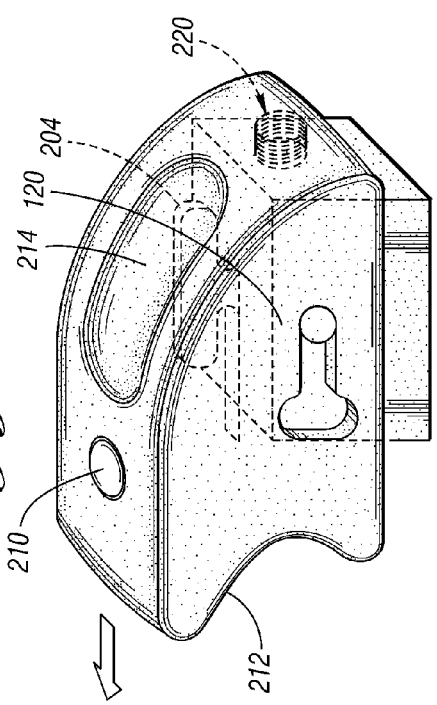

In at least one embodiment, and as illustrated in FIG. 3b, the switch body 104 is shown positioned in the transient position "B". In at least one embodiment, the switch body 104 moves along the longitudinal axis "L" of the guide 204, upon the preselected portion 214 being pushed in a direction of arrow shown. Once the switch body 104 arrives at the transient position "B", the transverse beam member 120 becomes in contact with the lateral terminal 222 of the insert passage 216.

Figure 3C:
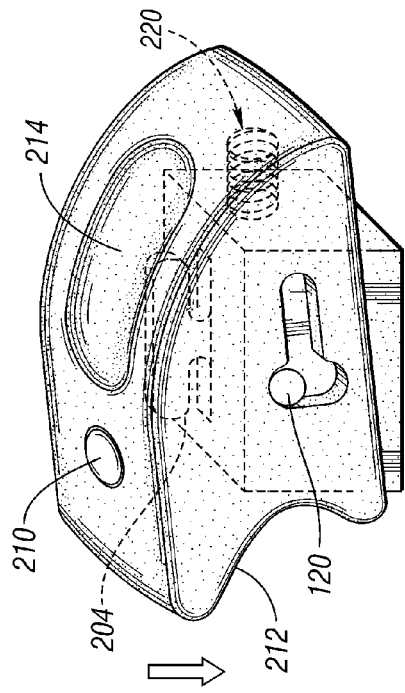

In at least one embodiment, and as shown in FIG. 3c, the switch body 104, through the insert passage 216, is shown pivoting about the transverse beam member 120 into the first transverse position "C". Once the switch body 104 arrives at the fist transverse position "C", the transverse beam member 120 becomes in contact with the first transverse terminal 224 of the insert passage 216. The pivoting of the switch body 104 is in a down direction indicated by the arrow shown, such as when the switch body 104 is pressed by a user. The switch body 104 is shown having the preselected portion 212 formed on the outer surface 202 of the switch body 104 to provide a feature to facilitate the ability of the user to grasp and operate the switch body 104. When the preselected 212 is pressed in the downward direction, the switch body 104 is forced to pivot about the transverse beam member 120. With the force being applied to the switch body 104 and the switch body 104 pivoting about the beam member 120 in the downward direction, there is an upward component of the force that is applied to the terminal 224. This upward component of the force causes terminal 224 to actuate the first transverse position "C". In one particular embodiment, such pivoting movement of the switch body 104 corresponds with the operation of the switch body 104 to control the movement of the vehicle window 119. For example, movement of the switch body 104 shown in FIG. 3c, operates the window 119 to open.

Figure 3D:
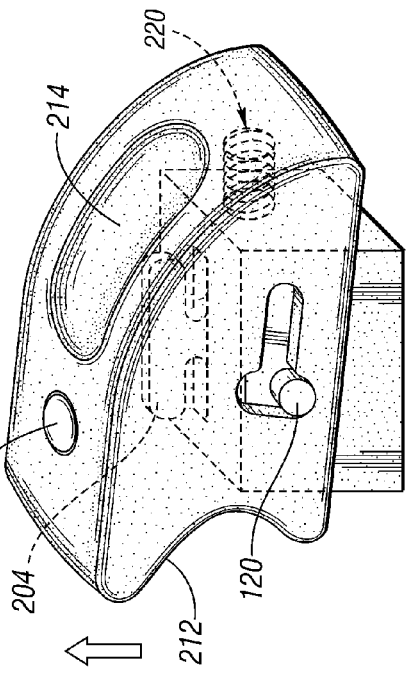

In FIG. 3d, the switch body 104, through the insert passage 216, is shown pivoted about the transverse beam member 120 into the first transverse position. The pivoting of the switch body 104 is in an upward direction, indicated by the arrow shown, such as when the switch body 104 is lifted by a user. When the preselected portion 212 is being lifted, the switch body 104 is forced to pivot about beam member 120. With the force being applied to the switch body 104 and the switch body 104 pivoting about the beam member 120 in the upward direction, there is a downward component of the force that is applied to the terminal 226. This downward component of force causes terminal 226 to actuate the second transverse position "D". In one particular embodiment, such pivoting movement of the switch body 104 generally corresponds with the operation of the switch body 104 to control the movement of the vehicle window 119. For example, movement of the switch body 104 shown in FIG. 3d, operates the window to close up.

Indicating lights may further be provided on the switch assembly 102 for indicating the status of one of the operative functions. Any of a plurality of types of light sources may be used to illuminate the switch assembly 102 by including a light pipe or any other suitable illuminating device. A suitable illuminating device can include an incandescent bulb or a light emitting diode (LED), a lens, and a reflector or collimating surface for directing the light toward the lens. If so desired, more than one light source may be used.

The indicating lights may take the form of light emitting diode (LED). In at least one embodiment, and as illustrated in the FIG. 2, a LED 210 is implemented on the switch body 104. The LED enabling signal may be generated in a variety of ways including: (1) when the door 100 is open and unlocked, (2) when the door is closed and locked, (3) for a predetermined time after either (1) or (2), (4) when the window 119 is opened, and or (5) when the window 119 is closed.

In at least one embodiment, the outer surface 202 of the switch body 104 may be of materials that filter light therethrough. For example, at least a portion of the outer surface 202 transmits light and the light transferred is tinted to a desired color. The outer surface 202 may be made of a material having various layers, each layer having various light transmission and/or filtering capabilities. The transmission or filtration of light through the outer surface 202 is desirable to illuminate an indicator or a graphic (not shown) on the outer surface 202. Regardless of the manner in which an indicator is made for the switch, the LED or light pipe acts to illuminate (back-light) the graphic for ease of viewing by the user of the vehicle.

In at one embodiment, the multi-functional switch assembly 102 may function in a two-stage fashion. By way of example, a first stage lifting up or pushing down through the preselected portion 212 actuates the window up or down while the switch body 104 is being maintained in each relative position such as being lifted or pressed. A second stage lifting up or pushing down may be actuated when after a certain lapse of time upon which the switch body 104 has been maintained in each above-mentioned relative position. The lapse of time may be pre-determined such as in a range of 3 seconds to 10 seconds. For example, after the lapse of 4 seconds upon which the preselected portion 212 has been maintained in a lifted-up position, the window up/down operation at this stage will not cease until the window is fully opened or closed; alternatively, it can be said that after the lapse of the predetermined 4 seconds, the switch body 104 is locked to complete the relevant operating function even if the preselected portion 212 is released from being lifted up or down.

In at least one embodiment, the terminals 222, 224, and 226 of the insert passage 216 is each in electrical communication with the motor 118 through a conductive material (not shown). The conductive material may be constructed as a separate layer being adhered to the terminals; alternatively, the conductive material may be directly coated onto each of the terminals. The terminals thus carry electrical signals between the switch assembly 102 and operating module 106 or 116 so as to actuate respective operating functions such as above-described door or window operations.

The electrically conductive material used to construct and/or coat the surfaces of the terminals 222, 224, and 226 may be a metal alloy. The conductive material is, for example, stamped from a metal alloy sheet stock material using a die that is cut to form a desired configuration. The metal sheet stock material is, for example, a copper alloy, a tin-brass alloy, a phosphor-bronze alloy, or alloys of other metals including stainless steel. The metals are tempered or otherwise treated to provide desired qualities in hardness, tensile strength, or yield strength, and may also be coated or otherwise treated to provide certain corrosion resistance.

Alternatively, a multi-functional switch assembly may take the configuration generally shown at 400 in FIG. 4. In this configuration, the switch body 104 has a built-in cavity 402 having a longitudinal width "W1" to receive at least a portion of the switch base 122. When received within the cavity 402, the switch base 122, having the attached spring 220, is positioned at a rest position depicted in FIG. 5a, wherein the longitudinal width "W2" of the switch base and the relaxed length "W3" of the spring 220 is substantially equal to "W1".

Upon a push in the direction of arrow shown in FIG. 5b, the spring 220 is stressed to a shorter length "W4" such that the switch body 104 moves in the direction of arrow relative to the switch body 122. This relative movement between the switch body 104 and the switch base 122 is guided through the transverse beam member 120 along an insert passage 404. When the transverse beam member 120 gets relocated to contact a transient terminal 410 of the insert passage 404, the switch body 104 arrives at a transient position shown in FIG. 5b.

Upon the release of the force with arrow shown in FIG. 5b, the switch body 104 automatically returns to the rest position shown in FIG. 5a, wherein the transverse beam member 120 is located at a lateral terminal 408 of the insert passage 404.

As depicted in FIG. 5c, upon a downward force with arrow shown being applied to the switch body 104, the top surface 418 of the cavity 402 forces downwardly a first end 412 of the guide 204 as the transverse terminal 406 becomes in contact with and pivots about the transverse beam member 120.

At the first transverse position wherein the first end 412 is in contact with the surface 416 of the switch base 122, a signal may be generated to electrically communicate for an operative function such as moving window up or down. Electrically conductive material as described above may be printed on a contacting surface (not shown) of either the first end 412, the surface 416, and/or contacting surfaces (not shown) between the transverse beam member 120 and the transverse terminal 406.

A second transverse position may be effectuated, as depicted in FIG. 5b, where a downward force with arrow shown forces a second end 414 of the guide 204 to come in contact with the surface 416. This contact, similar to the contact in relation to FIG. 5c, may also electrically translate to an operative function optionally by the employment of conductive materials as described above.

FIGS. 4 and 5a-5d collectively depict at least one embodiment wherein the transverse beam member 120 helps to guide the relative translation of the switch body 104 relative to the longitudinal axis of the guide 204. The guide 204 through it relevant portion 412 or 414 contacts the surface 416 of the switch base 122 to effectuate a set of operations such as moving window up or down or lock or unlock a vehicle door.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A switch assembly comprising:
   a switch base having a guide and a transverse beam member, the guide having a longitudinal axis and being substantially resilient; and
   a switch body mounted to the guide for limited translation along the longitudinal axis between a rest position and a transient position, wherein at the rest position, the switch body is pivotal about the transverse beam member between a first and a second transverse position.

2. The switch assembly of claim 1, wherein the switch body is spring loaded to return to the rest position from the transient position.

3. The switch assembly of claim 1, wherein a preselected portion of an outer surface of the switch body is pushed and released in a direction substantially along the longitudinal axis of the guide to effect respectively the rest and transient position translatable to a first set of operative functions.

4. The switch assembly of claim 1, wherein a first preselected portion and a second preselected portion of the switch body at the rest position are pressed to effectuate respectively the first and second transverse positions translatable to a second set of operative functions.

5. The switch assembly of claim 1, wherein a preselected portion of an outer surface of the switch body at the rest position is lifted and pressed to respectively effectuate the first and second transverse positions translatable to a second set of operative functions.

6. The switch assembly of claim 1 further comprising a light emitting diode (LED) indicating operation status.

7. The switch assembly of claim 1, wherein an outer surface of the switch body is at least partially translucent to light emission.

8. A vehicle door comprising:
   a door trim panel having a guide and a transverse beam member, the guide having a longitudinal axis and being substantially resilient; and
   a switch body mounted to the guide for limited translation along the longitudinal axis between a rest position and a transient position, wherein at the rest position, the switch body is pivotal about the transverse beam member between a first and a second transverse position.

9. The vehicle door of claim 8, wherein the switch body is spring loaded to return to the rest position from the transient position.

10. The switch assembly of claim 8, wherein a preselected portion of an outer surface of the switch body is pushed and released in a direction substantially along the longitudinal axis of the guide to respectively effectuate the rest and transient positions translatable to a first set of operative functions.

11. The switch assembly of claim 8, wherein a first preselected portion and a second preselected portion of the switch body at the rest position are respectively pressed to effectuate the first and second transverse positions translatable to a second set of operative functions.

12. The switch assembly of claim 8, wherein a preselected portion of an outer surface of the switch body at the rest position is lifted and pressed to respectively effectuate the first and second transverse positions translatable to a second set of operative functions.

13. The vehicle door of claim 8 further comprising a light emitting diode (LED) indicating operation status.

14. A switch assembly of a vehicle interior comprising:
   a switch base having a guide and a transverse beam member, the guide having a longitudinal axis defining a first end and a second end; and
   a switch body having an outer surface and an inner cavity, the guide being received through the inner cavity such that the switch body is mounted to the guide for limited translation along the longitudinal axis between a rest position and a transient position, wherein at the rest position, the switch body is pivotal about the transverse beam member to define a first transverse position along with the first end being bent and to define a second transverse position along with the second end being bent, wherein the rest and the transient positions are translatable to a first set of operative functions, wherein the first and the second transverse positions are translatable to a second set of operative functions.

15. The switch assembly of claim 14, wherein the switch body further comprises an insert passage having a lateral terminal, a first transverse terminal, and a second transverse terminal, wherein each of the terminals is in contact with an electrically conductive material for electrical communication with a motor of the vehicle.

16. The switch assembly of claim 15, wherein the first transverse position is formed when the first end of the guide bends in a direction transverse to the longitudinal axis of the end and the transverse beam member contacts the transverse terminal of the insert passage.

17. The switch assembly of claim 15, wherein the second transverse position is formed when the second end of the guide bends in a direction transverse to the longitudinal axis of the end and the transverse beam member contacts the transverse terminal of the insert passage.

18. The switch assembly of claim 14, further comprising a light emitting diode (LED) indicating the status of at least one of the operative functions.

* * * * *